(12) United States Patent
Muegge

(10) Patent No.: US 10,479,268 B2
(45) Date of Patent: Nov. 19, 2019

(54) SIDE-MOUNTED DIRECTION INDICATOR FOR VEHICLES HAVING A PLURALITY OF LIGHT SOURCES DISPOSED ON A COMMON CARRIER AND AN OPTICAL UNIT ASSOCIATED WITH THE PLURALITY OF LIGHT SOURCES

(71) Applicant: HELLA GmbH & Co. KGaA, Lippstadt (DE)

(72) Inventor: Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 58 days.

(21) Appl. No.: 15/825,987

(22) Filed: Nov. 29, 2017

(65) Prior Publication Data

US 2018/0079355 A1   Mar. 22, 2018

Related U.S. Application Data

(63) Continuation of application No. PCT/EP2016/060568, filed on May 11, 2016.

(30) Foreign Application Priority Data

May 29, 2015   (DE) ........................ 10 2015 108 486

(51) Int. Cl.
*B60Q 1/34*   (2006.01)
*B60Q 1/26*   (2006.01)
(Continued)

(52) U.S. Cl.
CPC ............. *B60Q 1/34* (2013.01); *B60Q 1/0076* (2013.01); *B60Q 1/2607* (2013.01);
(Continued)

(58) Field of Classification Search
CPC ..... B60Q 1/34; F21Y 2115/10; F21Y 2113/10
See application file for complete search history.

(56) References Cited

U.S. PATENT DOCUMENTS 7,452,113 B2 *  11/2008  Newton ............... B60Q 1/2665
                                                          362/494
9,726,809 B2 *  8/2017   Sato ...................... F21S 43/249
(Continued)

FOREIGN PATENT DOCUMENTS

DE          102 38 073 A1       3/2004
DE          102 51 380 A1       5/2004
(Continued)

*Primary Examiner* — Robert J May
(74) *Attorney, Agent, or Firm* — Muncy, Geissler, Olds & Lowe, P.C.

(57) ABSTRACT

A direction indicator for vehicles, having a first lighting unit containing a first light source and an optical unit paired with the first light source for generating a direction indicating function and comprising a second lighting unit containing a second light source and an optical unit paired with the second light source for generating an additional lighting function. The first light source and the second light source are paired with the same optical unit, and the second lighting unit is designed as a light-emitting visual information lighting device. The second light source can be activated and/or deactivated depending on a vehicle signal which triggers a non-lighting function of the vehicle.

12 Claims, 4 Drawing Sheets

(51) Int. Cl.
    *B60Q 1/50*         (2006.01)
    *F21S 43/237*     (2018.01)
    *F21S 43/37*      (2018.01)
    *F21S 43/14*      (2018.01)
    *F21S 43/19*      (2018.01)
    *F21S 43/20*      (2018.01)
    *B60Q 1/00*         (2006.01)
    *B60R 1/12*         (2006.01)
    *F21Y 113/10*     (2016.01)
    *F21Y 115/10*     (2016.01)

(52) U.S. Cl.
    CPC .............. *B60Q 1/2665* (2013.01); *B60Q 1/50* (2013.01); *B60R 1/1207* (2013.01); *F21S 43/14* (2018.01); *F21S 43/195* (2018.01); *F21S 43/237* (2018.01); *F21S 43/26* (2018.01); *F21S 43/37* (2018.01); *B60Q 2400/20* (2013.01); *F21Y 2113/10* (2016.08); *F21Y 2115/10* (2016.08)

(56) References Cited

U.S. PATENT DOCUMENTS

| | | |
|---|---|---|
| 2009/0147528 A1 | 6/2009 | Wang |
| 2011/0260848 A1 | 10/2011 | Rodriguez Barros et al. |
| 2012/0020099 A1* | 1/2012 | Bingle ................ B60Q 1/2665 362/464 |
| 2012/0057362 A1 | 3/2012 | Fritz et al. |
| 2014/0204599 A1 | 7/2014 | Miura et al. |
| 2015/0243141 A1 | 8/2015 | Muntada Roura |

FOREIGN PATENT DOCUMENTS

| | | |
|---|---|---|
| DE | 102 43 491 B4 | 7/2010 |
| DE | 20 2008 018 110 U1 | 10/2011 |
| DE | 10 2011 016 439 A1 | 10/2012 |
| EP | 2 340 967 A1 | 7/2011 |
| EP | 2 428 724 A1 | 3/2012 |
| EP | 274 6106 A1 | 6/2014 |
| EP | 2 783 916 A1 | 10/2014 |
| WO | WO 2014/026725 A1 | 2/2014 |

* cited by examiner

SIDE-MOUNTED DIRECTION INDICATOR FOR VEHICLES HAVING A PLURALITY OF LIGHT SOURCES DISPOSED ON A COMMON CARRIER AND AN OPTICAL UNIT ASSOCIATED WITH THE PLURALITY OF LIGHT SOURCES

This nonprovisional application is a continuation of International Application No. PCT/EP2016/060568, which was filed on May 11, 2016, and which claims priority to German Patent Application No. 10 2015 108 486.4, which was filed in Germany on May 29, 2015, and which are both herein incorporated by reference.

BACKGROUND OF THE INVENTION

Field of the Invention

The invention relates to a side-mounted direction indicator for vehicles having a first lighting unit containing a first light source and an optical unit assigned to the first light source for generating a side-mounted direction indicating function, and having a second lighting unit containing a second light source and an optical unit assigned to the second light source for generating an additional lighting function, wherein the first light source and the second light source are arranged on a common carrier.

Description of the Background Art

DE 102 38 073 A1, which is herein incorporated by reference, discloses a side-mounted direction indicator for vehicles, which is disposed in an outside rearview mirror of the vehicle and which serves to execute two lighting functions. A first lighting unit is provided for generating a side-mounted direction-indicating lighting function, which has a first light source and a first elongated optical fiber (optical unit) assigned to the former. The first light source emits light of a yellow light color. In order to generate a delimiting lighting function, a second lighting unit is provided which has a second light source and an elongated second optical fiber (optical unit) assigned to the former. The second light source is disposed on the outer rearview mirror side that faces the vehicle. The elongated optical fibers extend side by side in an arc-shaped manner up to a front side of the outside rearview mirror which includes the mirror surface. Both lighting units have a defined lighting function, which is independent of the vehicle type.

SUMMARY OF THE INVENTION

It is therefore an object of the present invention to further develop a side-mounted direction indicator for vehicles in such a way that additional lighting functions can be provided in a space-saving and simple manner.

In order to achieve this object, the invention is characterized in an exemplary embodiment in that the first light source and the second light source are assigned to the same optical unit, and that the second lighting unit is designed as a visual light-emitting informational lighting device, wherein the second light source can be switched on and/or off as a function of a vehicle signal which triggers a non-lighting function of the vehicle.

According to an embodiment of the invention, a lighting unit is integrated in a side-mounted direction indicator which serves in a space-saving manner as a lighting representation for the vehicle, that is, to create a brand-specific visual representation of the vehicle. For this purpose, a second lighting unit having a second light source is provided, which is designed as a visual light-emitting informational lighting device, wherein the second light source can be switched on and/or off as a function of a vehicle signal which triggers a non-lighting function of the vehicle. In the non-operating state of the vehicle in which the user of the vehicle is essentially outside the vehicle and the vehicle engine is not switched on, the second lighting unit can emit a light color that is different from conventional indicator lights, for example, blue, purple, cyan, green, etc. This light color, or light color combinations in the case of a plurality of "colored" second light sources of the second lighting unit, can serve to differentiate the lighting of the vehicle type or the vehicle manufacturer from others.

According to an embodiment of the invention, the informational lighting device is embodied as a lighting representation for the vehicle in any color or in a brand-specific color of the manufacturer or of a color typical of the vehicle classification, e.g., blue or green for electric vehicles. The informational lighting device can also be embodied as part of an overall lighting representation including additional lighting devices, for example, the headlights and tail lights of the vehicle. All informational lighting devices can be switched simultaneously or substantially simultaneously or switched on or off in a temporal sequence in order to present a dynamic light sequence for the vehicle. The triggering signal can be the opening or closing of the vehicle by the user of the vehicle with the aid of a remote control by means of a locking or unlocking signal for a door closing device of the vehicle. This is normally done by means of a remote control that is integrated in the vehicle key.

According to an embodiment of the invention, the informational lighting device is coupled to a door closing device. The second light source of the second lighting unit is controllable in such a way that the second light source is switched on or off by the user of the vehicle by means of a remote control when an unlocking signal and/or a locking signal for a door closing device of the vehicle is transmitted. The second lighting unit thus cooperates with the door closing device and serves as an informational lighting function for the user. It can quickly be signaled to the user whether he has just locked or opened the vehicle depending on the different number of light signals or different light colors when the door closing device is being unlocked (light color: green) or locked (light color: red). The informational lighting function in this respect can be combined with a brand-specific light representation of the vehicle manufacturer since the light color of the second lighting unit coincides with the brand-specific color of the vehicle manufacturer and/or with a light color of the dashboard or the interior lighting of the vehicle. Due to the different colors when unlocking and locking the vehicle, unique information is provided, in contrast to the yellow-flashing direction indicator which is currently commonplace.

According to an embodiment of the invention, the carrier of the first light source and of the second light source can be arranged extending in the direction of extension of the side-mounted direction indicator, wherein a plurality of first light sources and second light sources are disposed extending in the direction of extension of the carrier. The side-mounted direction indicator is therefore designed to be compact and elongated.

According to an embodiment of the invention, the optical unit can be designed as a reflector having an upper reflector half and a lower reflector half, wherein firstly the light sources are arranged between the reflector halves, and secondly, the light sources are arranged at a vertical distance below the light sources. The first variation is a direct reflector with a slot in which the plurality of first and second light sources are arranged such that its light is emitted directly in the direction of the lens, and indirectly in the direction of the lens by deflection by means of the reflector. The second variation is an indirect reflector, so that the light is emitted exclusively to the lens by deflection by means of the reflector. In this variation, the light sources are directed vertically downwards.

According to an embodiment of the invention, the reflector can be formed by a lower section of the housing so that the optical unit can be integrated in an outside rearview mirror in a space-saving manner.

According to an embodiment of the invention, the optical unit can be designed as an elongated rod-shaped or flat-shaped optical fiber, on the front side of which the first light source and the second light source are arranged. The coupled-in light is deflected or decoupled transversely with respect to the elongated optical fiber of the side-mounted direction indicator via outcoupling elements distributed on the rod-shaped or flat-shaped optical fiber, and the light is emitted through the lens to the outside to form the side-mounted direction indicator on the one hand and the informational lighting device on the other.

According to an embodiment of the invention, the first light source and the second light source can be arranged in pairs. For example, a plurality of second light sources of an identical or different light color may be arranged near the first light source. As the number of light sources increases, homogeneous illumination of the lens forming the light-emitting surface can be improved.

According to an embodiment of the invention, the lens can be designed as a crystal-clear lens with a dispersive optical system, in particular with a very small dispersive optical system (micro-optics), or as a diffuse, translucent lens.

According to an embodiment of the invention, the optical unit can also be formed by lenses, for example, Fresnel lenses or free-form lenses. Alternatively, the optical unit can also be formed only by the lens which delimits the housing of the side-mounted direction indicator when the light is emitted from directly radiating, semiconductor-based light sources. The omission of additional optics must be compensated by a corresponding number of first light sources and second light sources in order to ensure homogeneous illumination of the lens. If appropriate, the lens has a disperser for homogenizing the light.

According to an embodiment of the invention, the second light source can be configured as an RGB light source capable of emitting light of different colors. Advantageously, the light color of the second lighting unit can be adjusted by, for example, a vehicle control function, for example, by the user of the vehicle who can program, among other things, the interior lighting or a block heater of the vehicle controlled by means of a vehicle control device disposed in the vehicle.

According to an embodiment of the invention, the first and second light sources can both be replaced with an RGB light source which, on the one hand, provides the yellow light color for the side-mounted direction indicator and, on the other hand, any other color for the informational lighting device.

According to an embodiment of the invention, the side-mounted direction indicator can be integrally arranged in a lateral trim strip of the vehicle or on a lateral edge of the vehicle. Advantageously, the side-mounted direction indicator can be disposed in a side region of the vehicle, which is easily visible to the user or driver before entering the vehicle or when leaving the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
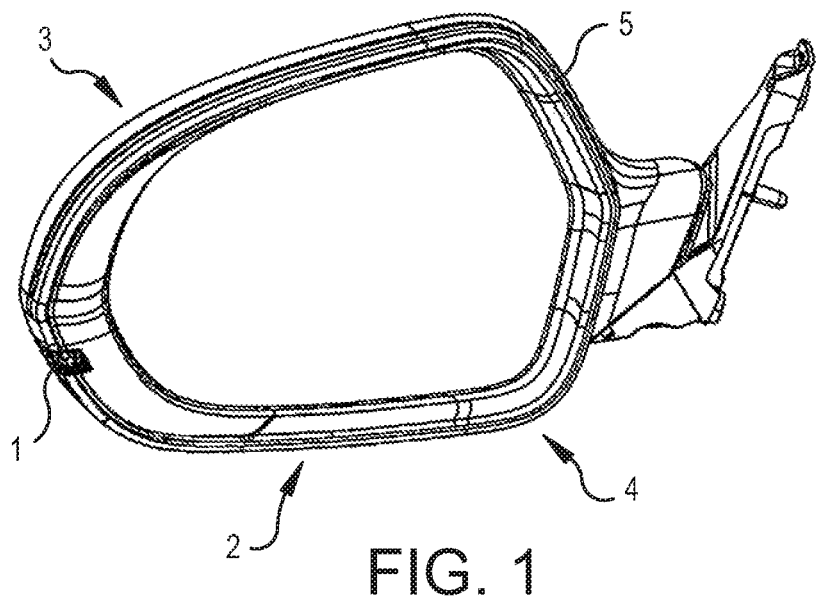
FIG. 1 is a front view of an outside rearview mirror of a vehicle in which a side-mounted direction indicator is integrated.
Figure 2:
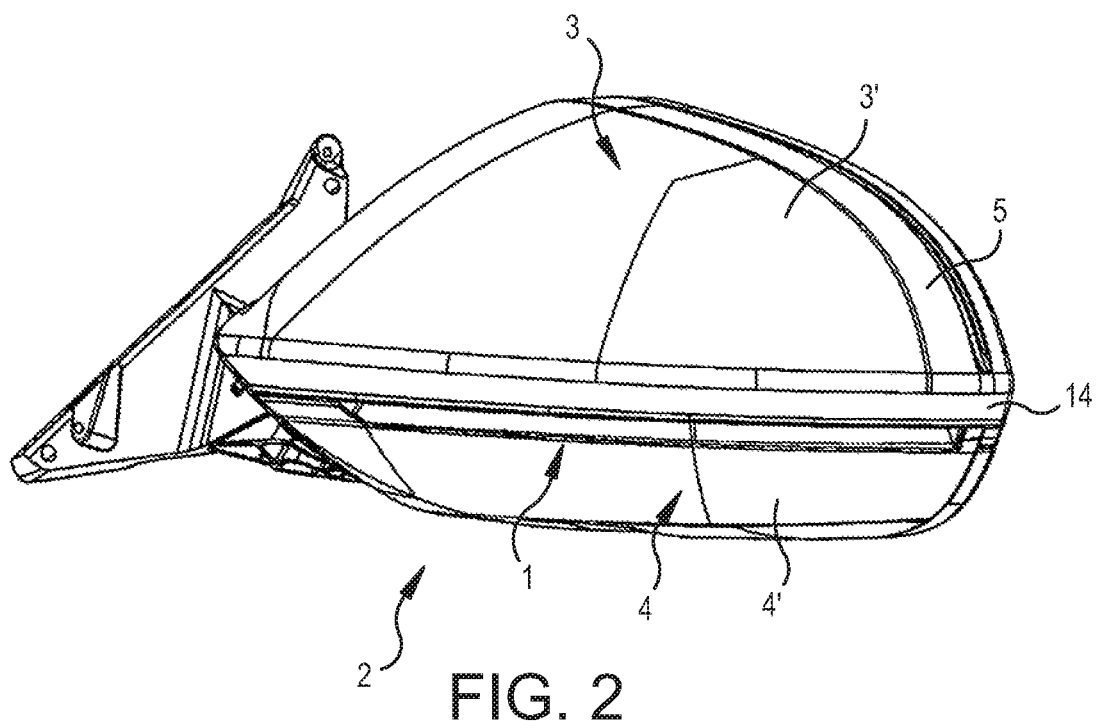
FIG. 2 is a rear side of the outside rearview mirror with a horizontally extending side-mounted direction indicator.

A side-mounted direction indicator for vehicles according to the invention can be integrally arranged in a lateral region of vehicles, for example in a lateral trim strip or on a lateral edge of the vehicle. In an embodiment of the invention, the side-mounted direction indicator can be designed straight-lined and elongated.

According to an embodiment of the invention illustrated in FIGS. 1 to 7, a side-mounted direction indicator 1 is integrally arranged in an outside rearview mirror 2 of a vehicle. The side-mounted direction indicator 1 is elongated and arcuate in shape and extends on a rear side of the outside rearview mirror 2 between an upper housing section 3 and a lower housing section 4 of a housing 5 of the outside rearview mirror 2.

Figure 3:
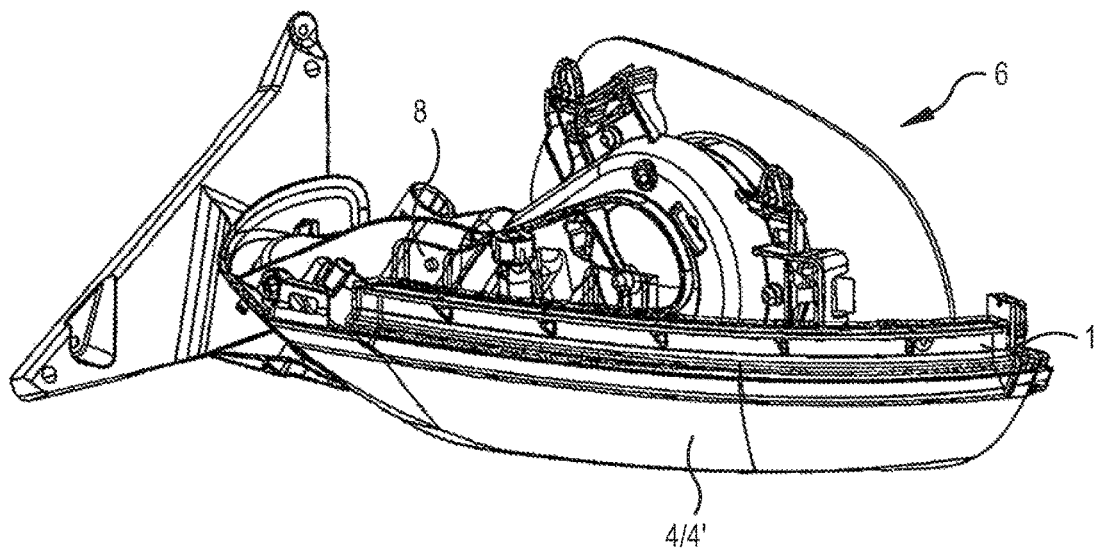
FIG. 3 is a rear side of the outside rearview mirror with a remote upper housing section.
Figure 4:
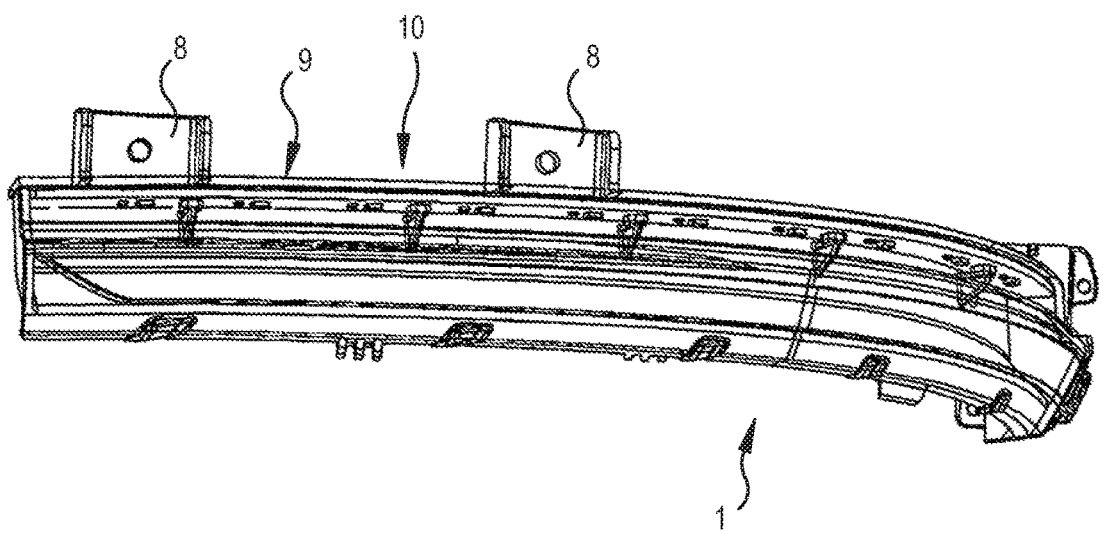
FIG. 4 is a rear view of the side-mounted direction indicator.
Figure 5:
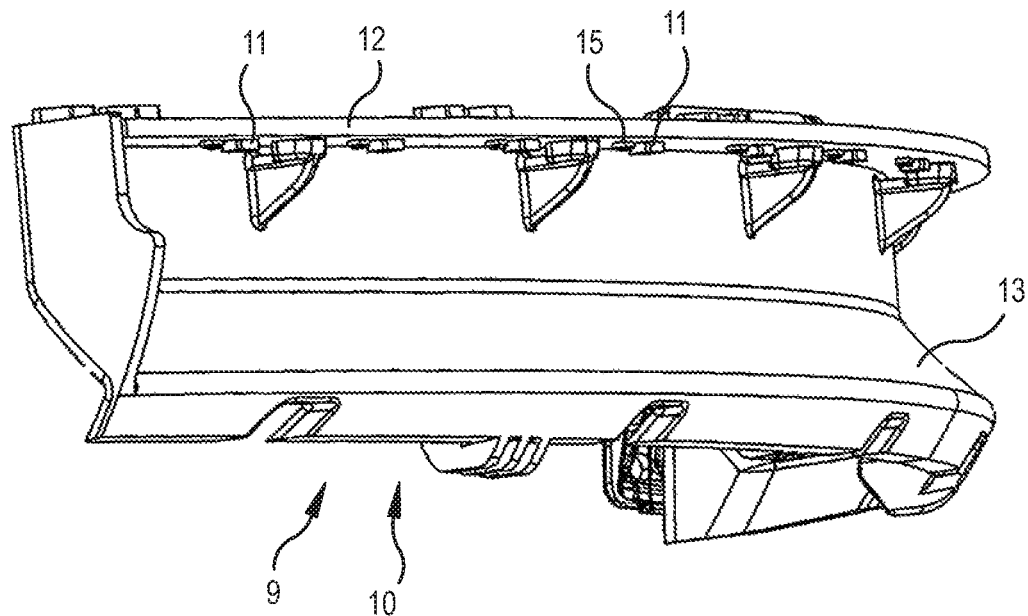
FIG. 5 is a rear view of the side-mounted direction indicator without a lens.
Figure 6:
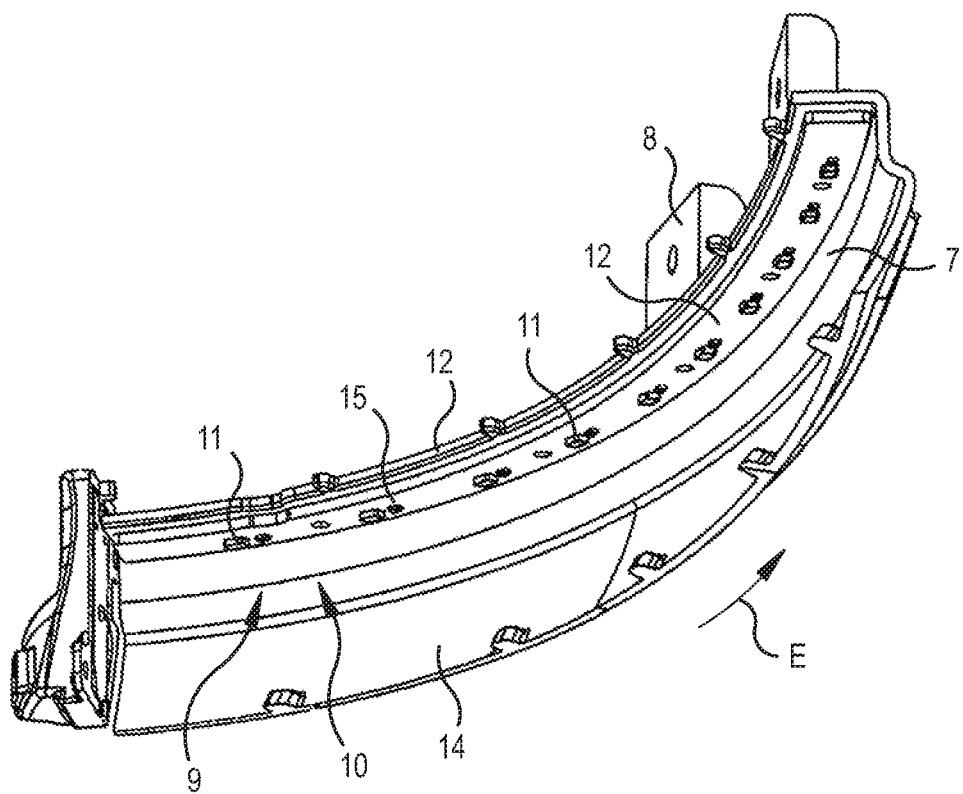
FIG. 6 is a front view of the side-mounted direction indicator without a housing, but with a light source carrier plate and a lens.
Figure 7:
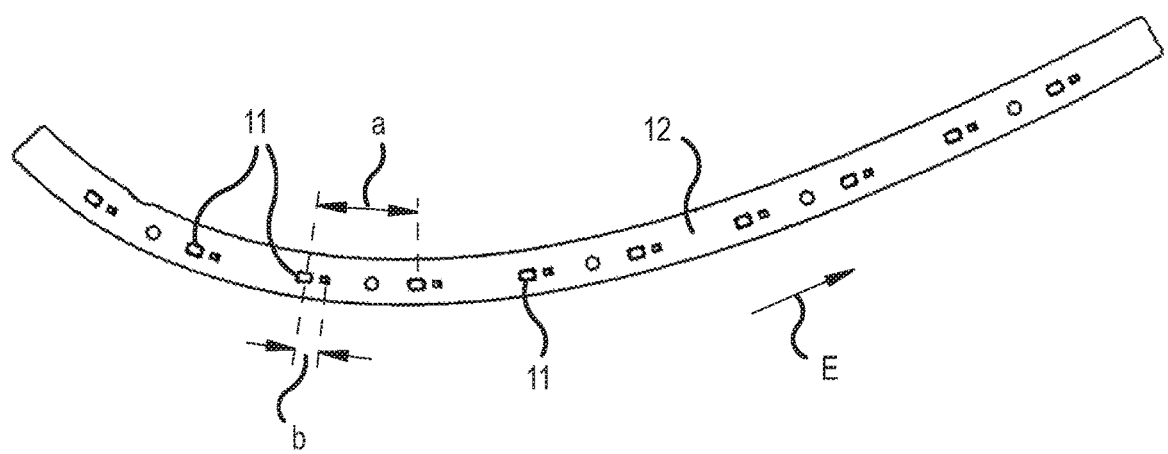
FIG. 7 is a bottom view of the light source carrier plate with first light sources and second light sources arranged in pairs.

As can be seen from FIG. 3, a mirror arrangement 6 is provided within the housing 5 of the outside rearview mirror 2. A housing 7 of the side-mounted direction indicator 1 has tabs 8, by means of which the side-mounted direction indicator 1 is fastened to the upper housing section 3 of the outside rearview mirror 2.

The lower housing section 4 of the outside rearview mirror 2 is of shell-shaped design. An upper edge of the lower housing section 4 is contoured in such a way that the side-mounted direction indicator 1 can be placed positively on the lower housing section 4. The side-mounted direction indicator 1 is integrated in the lower housing section 4 of the outside rearview mirror 2 and is bounded by the upper housing section 3.

The side-mounted direction indicator 1 has a first lighting unit 9 for generating a side-mounted direction indicating function, and a second lighting unit 10 for generating an additional lighting function, namely an informational lighting function. The second lighting unit 10 is designed as a visual light-emitting informational lighting device.

The first lighting unit 9 has a plurality of first light sources 1 which emit the light of a yellow light color. The first light sources 11 are arranged on a common light source carrier 12, preferably a rigid printed circuit board, which extends essentially in the horizontal direction. The first light sources 11 are arranged on a flat underside of the printed circuit board 12 at a distance a from one another. The light source carrier 12 extends in the direction of extension E of the side-mounted direction indicator 1, which extends in arcuate form in the horizontal direction between the upper housing section 3 and the lower housing section 4 of the outside rearview mirror 2.

As an optical unit, the first lighting unit 9 has a reflector 13 which is arranged on the inside of the lower housing section 4. Preferably, the reflector 13 is integrally connected to the lower housing section 4 of the outside rearview mirror 2 and/or is formed by a mirror-coated inner surface of the lower housing section 4. The reflector 13 extends on a side of the lower housing portion 4 which faces a front side of the outside rearview mirror 2 so that light radiated in the vertical downward direction from the first lighting unit 9 is reflected on the reflector 13 and in the direction of a lens 14 that closes off the side-mounted direction indicator 1. The lens extends as a partial rear face of the outside rearview mirror 2 between a rear face 3' of the upper housing section 3 and a rear face 4' of the lower housing section 4.

The lens 14 can be designed as a crystal-clear lens with a dispersive optical system, in particular with a very small dispersive optical system (micro-optics) or as a diffuse, translucent lens. In the second alternative, the lens 14 is a component of the optical unit of the first lighting unit 9.

The second lighting unit 10 has a plurality of second light sources 15 which are arranged on the same lower flat side of the light source carrier 12 at a relatively small distance b from the first light sources 11. The first light sources 11 and the second light sources 15 are therefore disposed in pairs at the small distance b from one another. The second light sources 15 emit light of a light color that is different from the first light sources 11. For example, the second light sources 15 can each emit a blue, violet, green, red light color.

The second lighting unit 10 has the same optical unit as the first lighting unit 9. The reflector 13 is assigned to the second light sources 15, the reflector serving to reflect the light of the lens 14 emitted by the second light sources 15.

The first lighting unit 9 and the second lighting unit 10 thus have the same light source carrier 12 and the same optical unit 13.

The second light sources 15 can be switched on and/or off as a function of a signal of the vehicle which triggers a non-lighting function of the vehicle. They can be used to display the brand-specific informational lighting of a vehicle manufacturer. For example, the second light sources 15 can be controlled in such a way that they emit the same light color as lamps disposed in the interior of the vehicle. Outside lighting can thus be provided when the vehicle is in the non-driving mode.

Preferably, the non-lighting function or a non-light-emitting functional device of the vehicle is designed as a door closing device, by means of which the vehicle door can be unlocked or locked, for example, by means of a remote control by the user. If, for example, the user of the vehicle actuates the radio remote control to open the vehicle, the second lighting unit 10 is simultaneously switched on when the vehicle door is unlocked. The duty cycle of the second lighting unit 10 can be relatively short, for example, one or several seconds.

Alternatively, the duty cycle of the second lighting unit 10 may last until the vehicle door of the vehicle has been closed, or until the vehicle is in driving mode. In the same way, when the vehicle door is locked by the actuation of the user of the vehicle, a corresponding switching-on of the second lighting unit 10 takes place. In this case, the duty cycle is one or several seconds. For example, the light color may be different when unlocking or locking the vehicle door so that the user of the vehicle recognizes whether the vehicle door has been unlocked or locked. This provides optical control for the correct actuation of the button on the radio remote control of the user. In this variation of the invention, the second light sources 15 are designed as RGB light sources, which are capable of emitting light in different light colors. Alternatively, two different light sources with different light colors can also be provided as second light sources 15.

The first light sources 11 and the second light sources 15 are preferably designed as semiconductor-based light sources, preferably as LED light sources.

According to an embodiment of the invention, instead of the first light source 11 and the second light source 15, only a single light source is provided, which is designed as an RGB light source. This is used to generate the side-mounted direction indicating function with a yellow light and to generate the informational lighting function with at least one other light color.

Due to the fact that the first light sources 11 and second light sources 15 are arranged relatively close to one another, approximately the same regions of the optical unit or region of the reflector 13 can be used. Since either the first lighting unit 9 or the second lighting unit 10 is switched on, this results in a relatively homogeneous light distribution or illumination of the elongated, preferably strip-shaped lens 14.

According to an embodiment of the invention, the reflector can extend in the vertical direction both above and below the first light sources 11 and second light sources 15. The light source carrier 12 extends in the vertical direction in a slot between an upper reflector half and a lower reflector half of the reflector. This is not an indirect reflector—as in the illustrated embodiment—but a direct reflector that radiates the light emitted by the first light sources 11 and the second light sources 15 in the same direction as the light directly emitted by the first light sources 11 and second light sources 15. The lens 14 is thus illuminated directly by the light emitted by the first light sources 11 or second light sources 15, and indirectly via light of the first light sources 11 or second light sources 15 that is radiated via the reflector. According to the illustrated embodiment, the lens 14 is illuminated only indirectly, namely via the light of the first light sources 11 or second light sources 15 reflected by the reflector 13. The upper and lower reflector surfaces of the reflector can, for example, be paraboloid in shape, wherein the first light sources 11 and the second light sources 15 are arranged within the range of a focal length of the reflector. The light source carrier 12 is arranged in a slot between the upper reflector half and the lower reflector half of the reflector.

According to an embodiment of the invention, the optical unit can be designed as an elongated rod-shaped or flat-shaped optical fiber, at which end face a single first light source 11 and a single second light source 15 are arranged. The optical fiber has outcoupling elements distributed in its longitudinal direction so that coupled-in light is deflected or decoupled laterally along a strip. Optionally, the light can be radiated directly to the outside into the surrounding environment without providing a lens when the lateral trim strip of the optical fiber forms a part of the outer contour of the outside rearview mirror 2 between the rear surface 3' of the upper housing portion 3 and the rear surface 4' of the lower housing portion 4.

According to an embodiment, the optical unit of the first lighting unit 9 or of the second lighting unit 10 can also be formed with lens optics, for example Fresnel lenses or free-form lenses. According to an embodiment, the optical unit can also be formed only with the lens 14 without further optical elements being provided. In this case, the first light sources 11 and the second light sources 15 are directly incident on the lens 14.

It is understood that the abovementioned features can be used individually or combined in any desired combination. The exemplary embodiments described are not to be taken as an exhaustive list, but rather are merely examples for the description of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A side-mounted direction indicator for vehicles comprising:
    a first lighting unit having a first light source for generating a side-mounted direction indicating function;
    a second lighting unit having a second light source for generating an additional lighting function; and
    an optical unit associated with and assigned to both of the first light source and the second light source, such that the optical unit is a same optical unit shared by the first light source and the second light source,
    wherein the first light source and the second light source are arranged on a common carrier,
    wherein the second lighting unit is configured as a visual light-emitting informational lighting device, and
    wherein the second light source is adapted to be switched on or switched off as a function of a signal of the vehicle that triggers a non-lighting function of the vehicle.

2. The side-mounted direction indicator according to claim 1, wherein the second light source is controlled such that the second light source is switched on or off when sending a signal which activates the unlocking of a vehicle door and a signal which acts on a door closing device of the vehicle, and/or when sending a signal which activates the locking of the vehicle door.

3. The side-mounted direction indicator according to claim 1, wherein the carrier extends in a direction of extension of the side-mounted direction indicator, wherein, along the carrier, a plurality of first light sources and a plurality of second light sources are arranged from which light is emitted via the optical unit in the direction of a lens closing off a housing of the side-mounted direction indicator, and wherein the second light sources radiate light of such a light color that the second lighting unit is adapted to be used for generating an informational lighting function for a user of the vehicle.

4. The side-mounted direction indicator according to claim 3, wherein the first light sources and the second light sources are arranged in pairs at a small distance from one another.

5. The side-mounted direction indicator according to claim 1, wherein the side-mounted direction indicator is integrated in a lower housing section of an outside rearview mirror and is bounded by an upper housing section, and wherein the lower and upper housing sections of the outside rearview mirror accommodate a mirror arrangement.

6. The side-mounted direction indicator according to claim 1, wherein the optical unit is formed by an elongated rod-shaped or flat-shaped optical fiber, on one front end of which the first light source and the second light source are arranged and which has dispersedly arranged outcoupling elements so that coupled-in light is laterally deflected or decoupled.

7. The side-mounted direction indicator according to claim 1, wherein the first light source emits light of a yellow light color and the second light source emits light of a light color which differs from the yellow light color of the first light source.

8. The side-mounted direction indicator according to claim 1, wherein the second light source is embodied as an RGB light source, or wherein only a single RGB light source is provided as the light source for generating the side-mounted direction indicating function with a yellow light and for generating the informational lighting function with another light color.

9. The side-mounted direction indicator according to claim 1, wherein the side-mounted direction indicator is integrally arranged in a decorative trim strip or on a lateral edge of the vehicle.

10. The side-mounted direction indicator according to claim 1, wherein the optical unit is a reflector.

11. The side-mounted direction indicator according to claim 1, wherein a plurality of the first light source and a plurality of the second light source are provided, wherein the plurality of the first light source and the plurality of the second light source are arranged in pairs that extend along a length of the carrier in an extension direction thereof, each pair including one of the first light source and one of the second light source, such that whether light is emitted from the plurality of the first light source or from the plurality of the second light source, the light is uniformly distributed along the length of the carrier in the extension direction thereof.

12. The side-mounted direction indicator according to claim 11, wherein a distance between the first light source and the second light source within each pair is smaller than a distance between adjacent pairs.

* * * * *